April 2, 1957  H. E. MELTZER  2,787,108
GRASS CUTTER, TRIMMER AND EDGER
Filed Nov. 7, 1955  2 Sheets-Sheet 1

INVENTOR
HENRY E. MELTZER

BY

ATTORNEYS

April 2, 1957  H. E. MELTZER  2,787,108
GRASS CUTTER, TRIMMER AND EDGER
Filed Nov. 7, 1955  2 Sheets-Sheet 2

INVENTOR
HENRY E. MELTZER

BY

ATTORNEYS

2,787,108

GRASS CUTTER, TRIMMER AND EDGER

Henry E. Meltzer, Racine, Wis., assignor to Allover Mfg. Co., Racine, Wis., a corporation Application November 7, 1955, Serial No. 545,327

1 Claim. (Cl. 56—25.4)

This invention appertains to power driven grass cutters, trimmers and edgers, and more particularly to new and useful improvements in a combination lawn tool, wherein an electrical motor is utilized for rapidly rotating a cutter blade.

Great difficulty has been experienced in the past with most combination lawn tools in that grass and other cut material winds around the rotating drive shaft and impedes the rotation of the cutter blade, causing overloading of the motor and the juices therefrom corrode and gum up the moving parts. While some devices have been developed in an effort to eliminate this problem, there is, nevertheless, a need for some positive means to completely solve the difficulty.

It is, therefore, a primary object of my present invention to provide a combination grass cutter, trimmer and edger so constructed that the grass and other material cut and juices therefrom will not only have free access out of the device but whereby positive means is incorporated to cut any material that may tend to work its way into the vicinity of the rotating drive shaft.

Another salient object of my present invention is not only to provide a primary cutter having blades rotating in a substantially horizontal plane to cut the grass or other material and to throw this cut material outwardly due to the centrifugal force, but to also provide a second inner cutter having blades lying in a vertical plane to cut and free all material which may work its way centrally toward the rotating drive shaft.

Still another object of my present invention is to provide a novel guard or shield which will obstruct most of the cut material from moving or working its way toward the central drive shaft.

A further object of my invention is to mount the secondary inner cutter in such a manner as to present vertical cutting edges in close proximity to the inner surface of the guard or shield and to construct the guard or shield so that if grass or material does work its way past the guard it will be directed to the cutter edge and immediately cut and thrown outward by centrifugal force to the main cutting blades where further force will throw the material from the machine.

A still further object of my invention is to provide a simple, practical and reliable construction that is economical to manufacture, easy to assemble and positive in its operation.

With the above and other objects in view, which will more readily appear as the nature of the invention is better understood, the same consists in the novel construction, combination and arrangement of parts hereinafter more fully described, illustrated and claimed.

A preferred and practical embodiment of my invention is shown in the accompanying drawings, in which drawings, Figure 1 is a fragmentary side elevational view partly in section showing a combination lawn tool embodying my present invention, the section being represented by the line 1—1 of Figure 2 of the drawings and looking in the direction of the arrows;

Referring now to the drawings in detail, wherein similar reference characters designate corresponding parts throughout the several views, the letter T generally indicates my improved combination garden tool.

Figure 1:
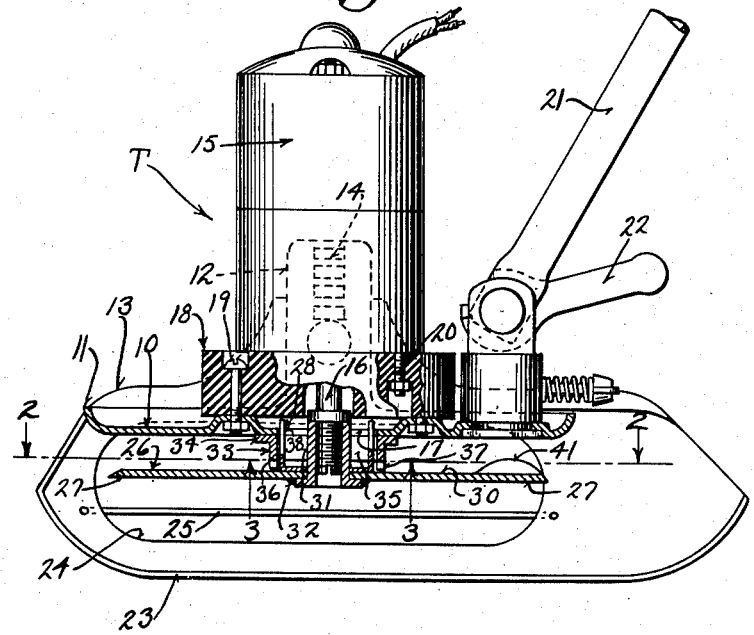
Figure 2:
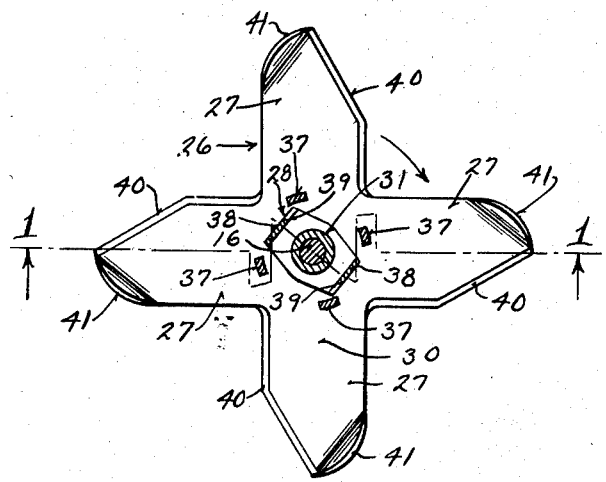
Figure 2 is a horizontal sectional view taken through my novel cutting mechanism, the section being represented by the line 2—2 of Figure 1 of the drawings and looking in the direction of the arrows.
Figure 3:
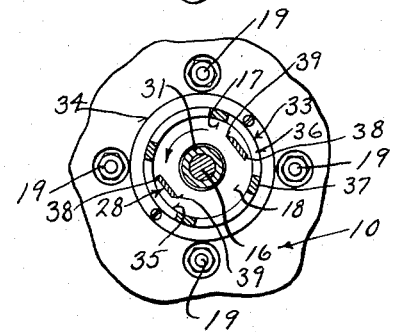
Figure 3 is a fragmentary horizontal sectional view taken through my novel cutting mechanism, the section being taken on the line 3—3 of Figure 1 of the drawings and looking in the direction of the arrows.

The general construction and arrangement of parts is quite similar to that described in the above co-pending application, and, therefore, the same will not be set forth in detail. However, the tool comprises, broadly, a guard plate 10 preferably formed of metal of a desired gauge and of substantially circular shape of top plan. The peripheral edge of the plate is provided with an upturned guide flange 11 which forms means for facilitating the guiding of vegetation being cut to the cutting member. The opposite sides of the plate 10 have formed thereon upstanding arms 12 for supporting the guard runners 13. The arms 12 are provided with transversely extending teeth 14 which are situated adjacent the upper ends of the runners 13 and facilitate the removal and adjustment of the same.

Mounted between the arms 12 on the upper face of the plate 10 is an electrical motor 15, and this motor can be of any desired type of fractional horse power grading. The armature shaft 16 of the motor extends downwardly and through an enlarged opening 17 formed in the axial center of the plate 10. The motor is mounted on a block of insulation material 18 by means of the sets of bolts 19 and 20. The tool also includes a handle 21 and the adjustment handle 22 for facilitating the movement and locking of the main handle 21 in any of a number of desired positions. The runner 13 is also provided with an inwardly directed flange 23 providing lower edges in the form of slide shoes, and the enlarged opening 24 in the runner is provided with a guide wire 25 which prevents a person from accidentally placing his foot into the cutter member 26.

Figure 4:
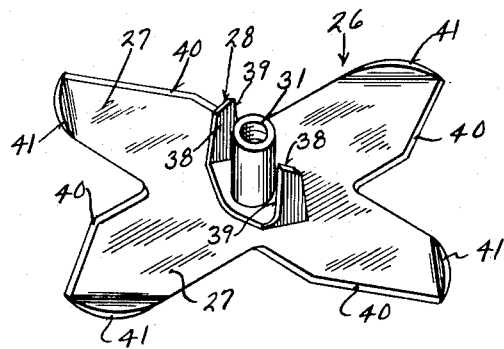
Figure 4 is a top plan view in perspective, illustrating in particular the novel construction and location of the inner second cutter and the main cutting blades.
Figure 5:
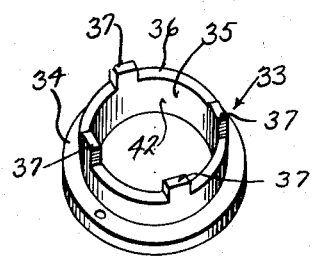
Figure 5 is a bottom plan view of my novel guard or shield, in perspective, shown removed from the machine.

As heretofore intimated, my present invention resides in the novel formation of the cutter assembly 26 and the guard or shield 33. In any event, my novel cutter assembly 26 includes broadly (note Figure 4 of the drawings), the main cutting blade 27, the inner cutter 28 arranged about the axial center of the main cutting blades 27 and securely welded adjacent the top portion 30 thereof, and a hub or sleeve 31 which is securely fixed at the axial center of the main cutting blades 27 preferably by welding at the point 32, as shown. As clearly shown in Figure 1 of the drawings, the hub or sleeve 31 is threaded on the motor armature or drive shaft 16 so that the entire assembly 26 may rotate at the desired speed. Also welded or bolted, as desired, to the underside of the plate 10 about the axial opening 17 is the guard or shield 33, and the same includes, broadly, an upper laterally extending peripheral flange portion 34 secured to the plate 10 and a circular sleeve-like body portion 35, the lower end of which is provided with a series of slots 36 defining depending lugs 37. It is to be noted that the inner cutter 28 is received within the shield or guard 33 and is adapted to rotate with the main cutting blades 27. The inner cutter 28 is provided with a number of, preferably two, vertically extending cutting blades 38 and these blades present a vertical cutting surface 39 on opposite sides from one another and in the same direction as the cutting edges 40 of the main cutting blades 27. The cutter blades 27, of course, lie in substantially a horizontal plane, but I prefer to bend the end termination of the main cutting blades 27 upwardly in a vertical direction, as indicated by the numeral 41. It should also be noted that the vertically extending blades 38 rotate in close proximity to the inner surface 42 of the guard member 33.

It will now be readily apparent that any cut material not thrown outwardly by centrifugal force from the main cutter blades 27 and tending to drift towards the axial center or hub 31 not only comes in contact with the stationary sleeve-like body portion 35 of the guard member 33 which acts to guide it away from the central hub, but also this material will be immediately cut by the vertically extending cutting edges 39 of the inner cutter member 28 as it moves out or through the slot 36.

Figure 6:
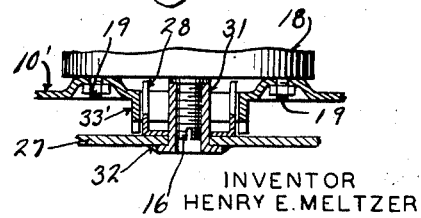
Figure 6 is a fragmentary vertical view somewhat similar to Figure 1 of the drawings but showing a preferred modified construction of the guard or shield.

While I have described my guard or shield member 33 as a separate piece, it is obvious that the same may be made integral with the plate 10. For example, in Figure 6 I have illustrated the preferred modified form and it should be remembered that the main cutter member assembly 26, including the center cutter 28 as well as the means for attaching to the hub 16, etc. are identical to the device above described; the only difference being that the guide member 33' is formed integral with the top plate 10'.

I lay great stress in the novel arrangement of my inner vertically positioned cutting blades 38 and my guard or shield member 33, particularly the structure of the slots 36, lugs 37, and the position of the blades adjacent thereto.

From the foregoing, it is believed that the features and advantages of my invention will be readily apparent to those skilled in the art, and it will of course be understood that changes in form, proportion and minor details of construction may be resorted to without departing from the spirit of the invention or the scope of the appended claim.

I claim:

A combination lawn tool of the type having a guard mounting plate and a drive motor secured to the upper face of the plate with a drive shaft extending through the plate and carrying a primary cutter arranged below the lower surface of the plate and lying substantially in a horizontal plane, a second cutter secured to the upper surface of said first cutter adjacent the axial center thereof, said second cutter having blades arranged in a vertical plane, whereby material cut by said primary cutter and tending to creep toward the drive shaft will be further cut and thrown from the machine, and a depending guard and shield member supported by said plate and having a sleeve-like body surrounding said shaft between said plate and primary cutter to further obstruct material from contacting said drive shaft, said sleeve-like body carrying depending lugs terminating in close proximity to said primary cutter, said vertical blades rotating adjacent to the inner surface of said sleeve-like body and depending lugs.

References Cited in the file of this patent

UNITED STATES PATENTS

| | | |
|---|---|---|
| 2,245,821 | Poynter | June 17, 1941 |
| 2,551,817 | Taylor | May 8, 1951 |
| 2,564,586 | Smith et al. | Aug. 14, 1951 |
| 2,708,820 | Britten III | May 24, 1955 |